US011988394B2

(12) United States Patent
Reindl et al.

(10) Patent No.: US 11,988,394 B2
(45) Date of Patent: May 21, 2024

(54) OPERATOR CONTROL PANEL AND DOMESTIC APPLIANCE

(71) Applicant: BSH Hausgeräte GmbH, Munich (DE)

(72) Inventors: Michael Reindl, Schalkham (DE); Manfred Steinbacher, Inzell (DE); Maximilian Wild, Rosenheim (DE)

(73) Assignee: BSH Hausgeräte GmbH, Munich (DE)

( * ) Notice: Subject to any disclaimer, the term of this patent is extended or adjusted under 35 U.S.C. 154(b) by 329 days.

(21) Appl. No.: 17/432,119

(22) PCT Filed: Feb. 25, 2020

(86) PCT No.: PCT/EP2020/054906
§ 371 (c)(1),
(2) Date: Aug. 19, 2021

(87) PCT Pub. No.: WO2020/178079
PCT Pub. Date: Sep. 10, 2020

(65) Prior Publication Data

US 2022/0136705 A1 May 5, 2022

(30) Foreign Application Priority Data

Mar. 1, 2019 (DE) ..................... 10 2019 202 805.5

(51) Int. Cl.
*G08B 6/00* (2006.01)
*F24C 7/08* (2006.01)
*G05G 5/03* (2008.04)

(52) U.S. Cl.
CPC ............... *F24C 7/082* (2013.01); *G05G 5/03* (2013.01)

(58) Field of Classification Search
USPC ........... 340/407.1, 426.22, 488, 515, 539.12, 340/539.22, 555, 571, 683, 691.5, 3.1,
(Continued)

(56) References Cited

U.S. PATENT DOCUMENTS 11,312,237 B2 4/2022 Kratz
2009/0189747 A1* 7/2009 Baier ...................... F24C 7/082 340/407.1

(Continued)

FOREIGN PATENT DOCUMENTS

CN 09323530 A 2/2019
DE 20002947 U1 6/2001

(Continued)

OTHER PUBLICATIONS

International Search Report PCT/EP2020/054906 dated May 26, 2020.

*Primary Examiner* — Daniel Previl
(74) *Attorney, Agent, or Firm* — Michael E. Tschupp; Andre Pallapies; Brandon G. Braun

(57) ABSTRACT

An operator control panel for a household appliance includes an operator control front, a panel carrier supporting the operator control front and having a recess, and a haptic actuator guided through the recess of the panel carrier for coupling to the operator control front so that during an operator control procedure of the operator control panel the haptic actuator outputs a haptic signal as feedback to a user in response to the operator control procedure via the operator control front.

18 Claims, 5 Drawing Sheets

(58) Field of Classification Search
USPC .......................................... 340/825.22, 825.23
See application file for complete search history.

(56) References Cited

U.S. PATENT DOCUMENTS

| | | | | |
|---|---|---|---|---|
| 2012/0010506 | A1* | 1/2012 | Ullrich | A61B 8/12 600/440 |
| 2012/0167648 | A1* | 7/2012 | Cantizani | C11C 1/08 422/187 |
| 2014/0107471 | A1* | 4/2014 | Haider | A61B 5/1076 606/82 |
| 2016/0259411 | A1* | 9/2016 | Yoneoka | G06F 3/03547 |
| 2018/0314287 | A1* | 11/2018 | Crosby | G05G 5/03 |
| 2020/0162616 | A1* | 5/2020 | Bender | H04M 1/72454 |

FOREIGN PATENT DOCUMENTS

| | | | |
|---|---|---|---|
| DE | 102011079229 | A1 | 1/2013 |
| DE | 102012005685 | A1 | 9/2013 |
| DE | 102015103874 | A1 | 9/2016 |

* cited by examiner

OPERATOR CONTROL PANEL AND DOMESTIC APPLIANCE

CROSS-REFERENCES TO RELATED APPLICATIONS

This application is the U.S. National Stage of International Application No. PCT/EP2020/054906, filed Feb. 25, 2020, which designated the United States and has been published as International Publication No. WO 2020/178079 A1 and which claims the priority of German Patent Application, Serial No. 10 2019 202 805.5, filed Mar. 1, 2019, pursuant to 35 U.S.C. 119(a)-(d).

BACKGROUND OF THE INVENTION

The present invention relates to an operator control panel for a household appliance, in particular for a household cooking appliance, and to a household appliance, in particular a household cooking appliance, with an operator control panel of this kind.

Ovens or other household appliances can be controlled via displays with sensory operator control panels. In this context, mechanical rotary selectors with latching can be replaced by fully touch-capable graphical displays. Even in the case of fully touch-capable graphical displays of this kind, however, there is the desire for haptic and/or acoustic operator control feedback, as the user is accustomed to from mechanical rotary selectors or from mechanical operator control buttons.

DE 10 2015 103 874 A1 describes a program-controlled household appliance with a housing and a facility for outputting sound, which comprises an acoustic converter and a control facility with a memory, which is configured to output a signal or data pattern to the acoustic converter in order to generate acoustic outputs. The facility for outputting sound comprises a receiving facility for receiving electrical signals or data patterns on a remote transmitting facility, in order to feed these received signals or data patterns to the acoustic converter for conversion in order to output audio sequences or sound sequences.

BRIEF SUMMARY OF THE INVENTION

Against this background, an object of the present invention consists in providing an improved operator control panel.

Accordingly, an operator control panel is proposed for a household appliance, in particular for a household cooking appliance. The operator control panel comprises an operator control front, a panel carrier which supports the operator control front, and a haptic actuator which is coupled to the operator control front in order, during an operator control procedure of the operator control panel, to output a haptic signal as feedback to a user in response to the operator control procedure with the aid of the operator control front, wherein the panel carrier has a recess, through which the haptic actuator is guided to the operator control front.

As a result of the haptic actuator being guided through the panel carrier, it is possible to apply vibrations only to the operator control front in a targeted manner in order to output the haptic signal. It is therefore not necessary to excite the entire operator control panel. This means that the haptic signal can be amplified and/or a power of the haptic actuator can be reduced.

Preferably, the panel carrier is attached to the rear side of the operator control front, in particular is adhesively bonded thereto. The haptic actuator is also attached to the rear side of the operator control front. For example, the haptic actuator is adhesively bonded directly to the operator control front. The haptic actuator is preferably what is known as a structure-borne sound converter in the form of an exciter. A structure-borne sound converter of this kind substantially involves an electrodynamic speaker without diaphragm. This means that a voice coil of the structure-borne sound converter does not drive a speaker diaphragm, but rather in particular is connected directly to the operator control front. In this context, a haptic signal in the form of vibrations is preferably applied to the operator control front.

In particular, the operator control panel is a touchscreen or comprises a touchscreen. The term "touchscreen" may also be replaced by the terms "touch screen", "touch-activated screen" or "sensor screen". In the present case, a "touchscreen" is to be understood as meaning a combined input and output device, in which the program sequence of a technical device, in the present case the household appliance, can be directly controlled by touching parts of an image. In this context, the entire operator control front of the operator control panel may be a touchscreen or selected regions, known as "buttons" or "touch buttons", on the operator control front may be embodied as touchscreens.

In accordance with one embodiment, the haptic actuator is additionally suitable for outputting an acoustic signal as feedback in response to the operator control procedure.

This advantageously makes it possible for an acoustic signal to be output in addition to the haptic signal. The acoustic signal may be a click noise, for example, which simulates the switching of a mechanical switch.

In accordance with a further embodiment, the operator control panel further comprises an acoustic signal emitter for outputting an acoustic signal as feedback in response to the operator control procedure.

The acoustic signal emitter may be a speaker, for example.

In accordance with a further embodiment, the operator control panel further comprises an input and output facility for detecting the operator control procedure and for outputting an operating state of the household appliance.

The operating state may, for example, be a program chosen with the aid of the input and output facility. The input and output facility may be a display, in particular a touch display, or may comprise one. With the aid of the input and output facility, it is possible, for example, for the operating state of the household appliance to be displayed or output. At the same time, the input and output facility is also in particular suitable for detecting an input, for example a program selection, of the user on the household appliance. For example, the input and output facility may detect a touching of the operator control front. The input and output facility may be a sensory operator control detection facility, comprise a sensory operator control detection facility of this kind, or be referred to as such.

In accordance with a further embodiment, the input and output facility is accommodated in the recess.

The input and output facility may be adhesively bonded to the operator control front. In particular, the input and output facility is provided on the rear side of the operator control front. The panel carrier is also preferably provided on the rear side of the operator control front.

In accordance with a further embodiment, the haptic actuator is arranged adjacent to the input and output facility.

This results in a compact design of the operator control panel.

In accordance with a further embodiment, the operator control panel further comprises a large number of haptic actuators, which are arranged distributed around the input and output facility.

This makes it possible to generate different haptic signals. Furthermore, it is possible for a plurality of different touch buttons to be realized. In particular, the input and output facility is provided between the haptic actuators. The number of haptic actuators is freely selectable.

In accordance with a further embodiment, the operator control panel further comprises an intermediate element, which is arranged between the operator control front and the panel carrier.

Preferably, a wall thickness of the intermediate element is greater than a wall thickness of the operator control front. For example, the operator control front may have a wall thickness of 1.5 mm. The intermediate element may have a wall thickness of 3 mm. The panel carrier is preferably a metal sheet. The panel carrier may also have a wall thickness of approx. 1 mm.

In accordance with a further embodiment, the haptic actuator is guided through the intermediate element.

To this end, the intermediate element has a cutout or a recess. Preferably, in the event that a plurality of haptic actuators are provided, a plurality of cutouts or recesses may be provided in the intermediate element.

In accordance with a further embodiment, the intermediate element is adhesively bonded to the operator control front and the panel carrier.

This results in a lasting and fixed connection between the structural parts of the operator control panel. In particular, the intermediate element is arranged in a sandwich-like manner between the operator control front and the panel carrier.

In accordance with a further embodiment, the intermediate element is made of a plastic material, in particular from polymethyl methacrylate, and the operator control front is made of glass.

Alternatively, any other suitable plastic material may be used for the intermediate element. The use of glass gives an impression of high quality. Furthermore, this protects the operator control front from being scratched.

In accordance with a further embodiment, the intermediate element comprises recesses, with the aid of which it is possible to influence the propagation of waves of a structure-borne sound generated with the aid of the haptic actuator.

This makes it possible to amplify or reduce the haptic sensation on a local basis. As a result, for example, it is possible to define a limited operator control region, in particular a touch button, on the operator control front.

In accordance with a further embodiment, the recesses in each case form a local depression on the operator control panel, which makes it possible to achieve a local influencing of the haptic signal.

This makes it possible to reduce the power of the haptic actuator. The “local influencing” may be an amplification or a reduction.

Furthermore, a household appliance, in particular a household cooking appliance, with an operator control panel of this kind is proposed.

The household appliance may be an oven or the like, for example.

In accordance with one embodiment, an appliance carcass of the household appliance has an insulating material, in order to absorb structure-borne sound resonances of the haptic actuator.

This prevents an undesirable generation of noise. It is possible for bitumen mats to be used as the insulating material or absorption material, for example. The operator control panel can be connected to the appliance carcass in a fixed manner, for example screwed, or connected thereto in a resilient manner, for example with the aid of springs or a resilient material. The appliance carcass may be a housing of the household appliance.

Further possible implementations of the operator control panel and/or of the household appliance also comprise combinations—not explicitly mentioned—of features or embodiments described above or below in respect of the exemplary embodiments. In such cases the person skilled in the art will also add individual aspects as improvements or amendments to the respective basic form of the operator control panel and/or of the household appliance.

BRIEF DESCRIPTION OF THE DRAWINGS

Further advantageous embodiments and aspects of the operator control panel and/or of the household appliance form the subject matter of the subclaims and of the exemplary embodiments of the operator control panel and/or of the household appliance described below. The operator control panel and/or the household appliance are further explained in greater detail below on the basis of preferred embodiments with reference to the appended figures.

DETAILED DESCRIPTION OF EXEMPLARY EMBODIMENTS OF THE PRESENT INVENTION

Figure 1:
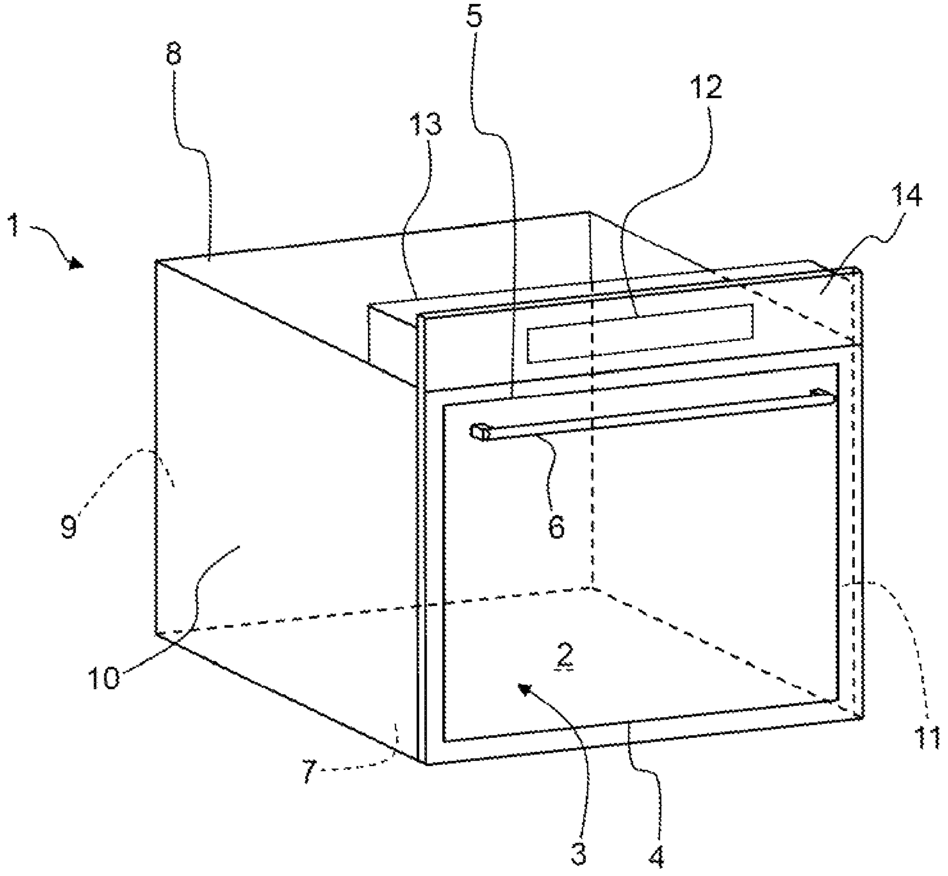
FIG. 1 shows a schematic perspective view of an embodiment of a household appliance.

In the figures, elements that are identical or have the same function have been provided with the same reference characters unless otherwise stated.

FIG. 1 shows a schematic perspective view of an embodiment of a household appliance 1. In particular, the household appliance 1 is a household cooking appliance. For example, the household appliance 1 may be an oven, an oven with steam-cooking function, a combined microwave-oven, a double oven or the like. The household appliance 1 has a receiving space 2, which can be closed off with the aid of a door 3. The receiving space 2 can be a cooking compartment of the household appliance 1. The receiving space 2 may also be referred to as muffle or oven muffle. The receiving space 2 can be arranged in the interior of a housing of the household appliance 1.

The door 3 is shown in a closed position in FIG. 1. The door 3 can be closed or opened by pivoting about a pivot axis provided on a lower end or a lower edge 4 of the door. Alternatively, the door 3 can be hinged on the side of the receiving space 2. Furthermore, the door 3 can be arranged on a sliding baking tray which can be pulled out from the receiving space 2.

A handle 6 can be provided on an upper section or on an upper edge 5 of the door 3. The receiving space 2 has a bottom 7, a ceiling 8 arranged opposite the bottom 7, a rear wall 9 arranged opposite the closed door 3 and two side walls 10, 11 arranged opposite one another. The receiving space 2 is preferably shaped like a box or a cube. The receiving space 2 can be made of a metal material, in particular from sheet steel.

The household appliance 1 further comprises an operator control panel 12, with the aid of which the household appliance 1 can be operated. For example, with the aid of the operator control panel 12, a temperature in the receiving space 2 can be set and also displayed. The operator control panel 12 may be part of a control facility 13 (only shown schematically) for controlling the household appliance 1. The control facility 13 can be a regulating and/or control facility. The operator control panel 12 is attached to an appliance carcass 14 of the household appliance 1.

Figure 2:
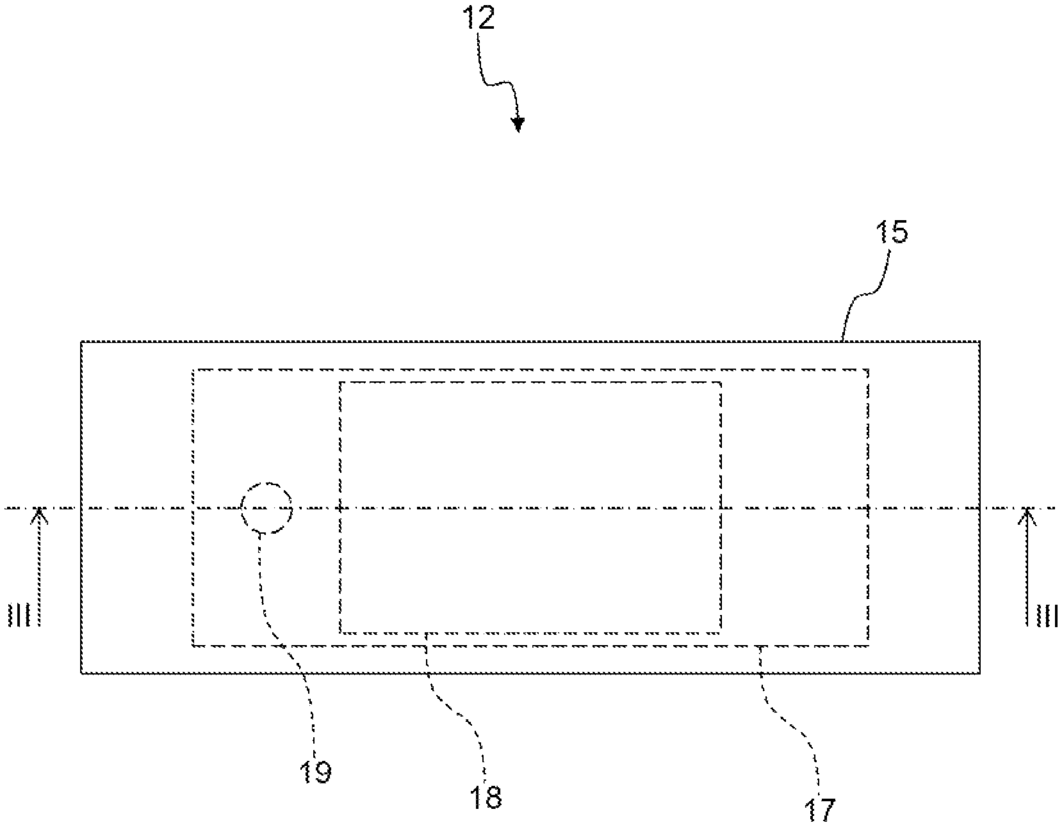
FIG. 2 shows a schematic front view of an embodiment of an operator control panel for the household appliance in accordance with FIG. 1.
Figure 3:
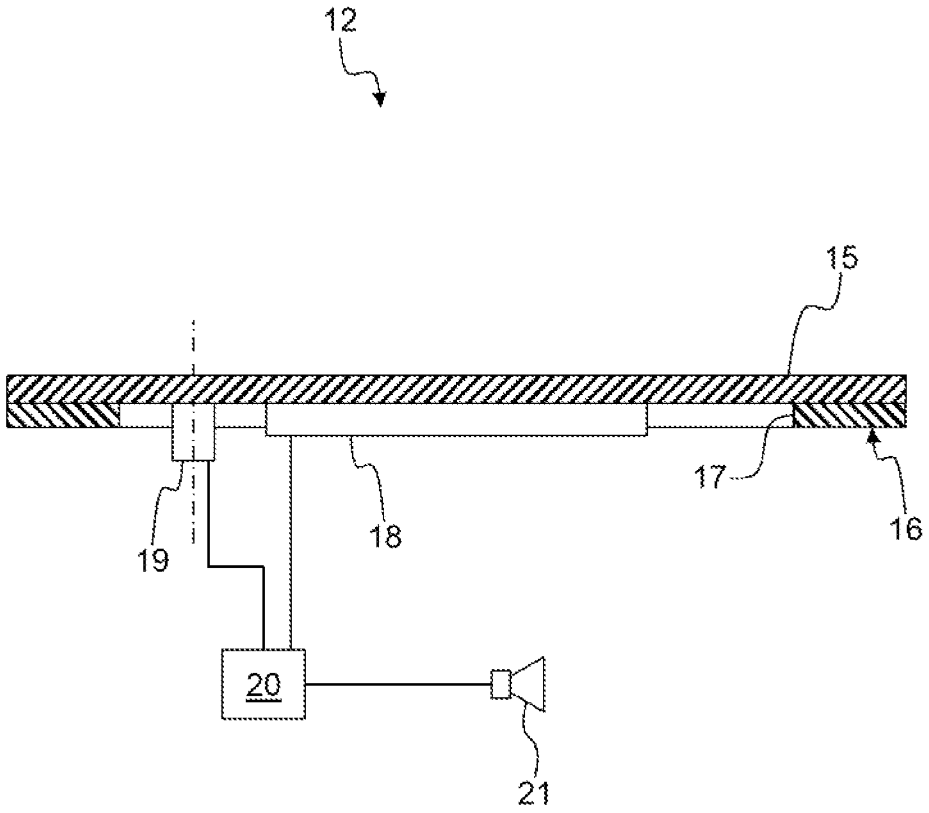
FIG. 3 shows a schematic sectional view of the operator control panel in accordance with the section line III-III in FIG. 2.

FIG. 2 shows a schematic front view of an embodiment of an operator control panel 12 as previously mentioned. In FIG. 2, covered structural parts are shown by dashed lines. FIG. 3 shows a schematic sectional view of the operator control panel 12 in accordance with the point of intersection III-III in FIG. 2. Reference is made below simultaneously to FIGS. 2 and 3.

In particular, the operator control panel 12 is a touchscreen or comprises a touchscreen. The term "touchscreen" may also be replaced by the terms "touch screen", "touch-activated screen" or "sensor screen". In the present case, a "touchscreen" is to be understood as meaning a combined input and output device, in which the program sequence of a technical device can be directly controlled by touching parts of an image. In this context, an entire operator control front 15 of the operator control panel 12 may be a touchscreen or selected regions, known as "buttons" or "touch buttons", on the operator control front 15 may be embodied as touchscreens.

In order to operate the operator control panel 12, a user can touch the operator control front 15 and exert pressure onto it where appropriate. The operator control front 15 may, for example, be a pane of glass with a wall thickness of approx. 1.5 mm. The operator control panel 12 furthermore comprises a panel carrier 16, which supports the operator control front 15. For example, the operator control front 15 is adhesively bonded to the panel carrier 16. The panel carrier 16 is provided on the rear side of the operator control front 15. The panel carrier 16 may be a steel sheet, for example. The panel carrier 16 comprises a cutout or a recess 17. The recess 17 may have a rectangular geometry, for example. The panel carrier 16 may be connected to the appliance carcass 14 in a fixed manner, for example screwed thereto.

An input and output facility 18 is accommodated in the recess 17. The input and output facility 18 may be a display, in particular a touch display. With the aid of the input and output facility 18, it is possible, for example, for an operating state of the household appliance 1 to be displayed or output. At the same time, the input and output facility 18 is also suitable for detecting an input, for example a program selection, of a user on the household appliance 1. For example, the input and output facility 18 may detect a touching of the operator control front 15. The input and output facility 18 may be adhesively bonded to the operator control front 15. In particular, the input and output facility 18 is provided on the rear side of the operator control front 15. The input and output facility 18 may be a sensory operator control detection facility or be referred to as such.

Furthermore, a haptic actuator 19 is accommodated in the recess 17. The haptic actuator 19 is positioned adjacent to the input and output facility 18. In particular, the haptic actuator 19 is guided to the operator control front 15 through the recess 17 of the panel carrier 16. The haptic actuator 19 is connected to the operator control front 15 in a fixed manner. For example, the haptic actuator 19 can be adhesively bonded to the operator control front 15. In particular, the haptic actuator 19 is adhesively bonded to the rear side of the operator control front 15. The haptic actuator 19 may also be referred to as haptic actuating element or touch feedback element.

The haptic actuator 19 may be a cylindrical structural part. With the aid of the haptic actuator 19, it is possible to output a haptic signal, for example in the form of vibrations, to the user via the operator control front 15, so that the user receives feedback in response to an input on the input and output facility 18 made by the user. The haptic actuator 19 is preferably a structure-borne sound converter (exciter), or may be referred to as such. A "structure-borne sound converter" involves an electrodynamic speaker without diaphragm. This means that a voice coil of the haptic actuator 19 does not drive a speaker diaphragm, but rather is connected directly to the operator control front 15. The operator control front 15 can be made to vibrate in accordance with the haptic signal.

The haptic actuator 19 and the input and output facility 18 are coupled to a control unit 20. For example, the control unit 20 detects a touching of the operator control front 15 with the aid of the input and output facility 18. The control unit 20 is further able to activate the haptic actuator 19. With the aid of the control unit 20, a haptic and/or acoustic signal, in particular a feedback signal, to the user takes place with the aid of a corresponding activation of the haptic actuator 19. The haptic signal may be a vibration of the operator control front 15.

The acoustic signal may be a click noise, for example. The acoustic signal is intended to simulate the operator control noise of a mechanical switch to the best possible extent, in particular by way of a selected click noise. In conjunction with the haptic feedback, this results in an accustomed tactile feeling when actuating the operator control panel 12. In this context, the acoustic signal can either be superimposed over the haptic signal of the haptic actuator 19, or broadcast with the aid of a separate acoustic signal emitter 21. The acoustic signal emitter 21 is likewise coupled to the control unit 20. The acoustic signal emitter 21 may be a speaker.

The input and output facility 18 is connected to the operator control front 15 in a fixed manner, as previously mentioned. For example, the input and output facility 18 is adhesively bonded to the operator control front 15. The operator control panel 12 is connected to the appliance carcass 14 in a fixed manner. The entire operator control panel 12 is therefore haptically excited when it is operated.

The operator control panel 12 may also be designed in a vibrating manner, however. In this case, it is not connected to the appliance carcass 14 in a fixed manner, but rather is coupled thereto or suspended therein by means of resilient structural parts. Mechanical springs or rubber-like materials are used as resilient structural parts, for example. The haptic actuator 19 is therefore able to make the resiliently suspended operator control panel 12 vibrate mechanically more easily, which enables an improved haptic feedback by the haptic actuator 19.

Figure 4:
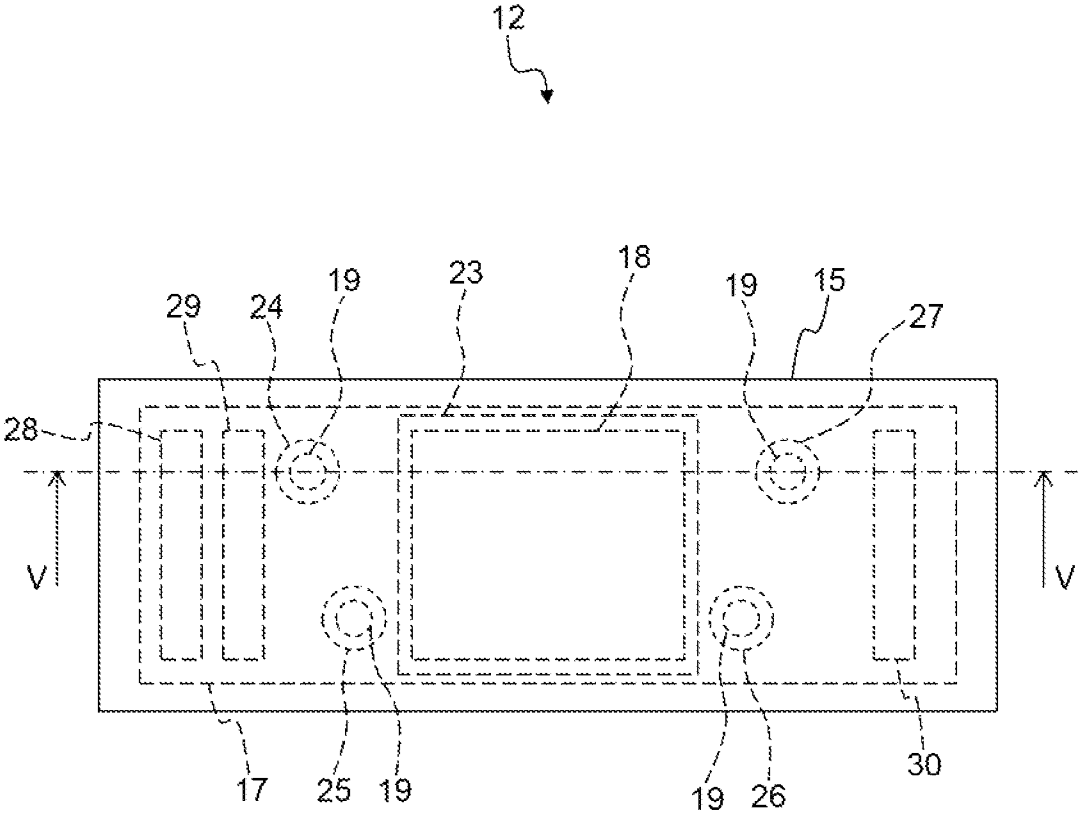
FIG. 4 shows a schematic front view of a further embodiment of an operator control panel for the household appliance in accordance with FIG. 1.
Figure 5:
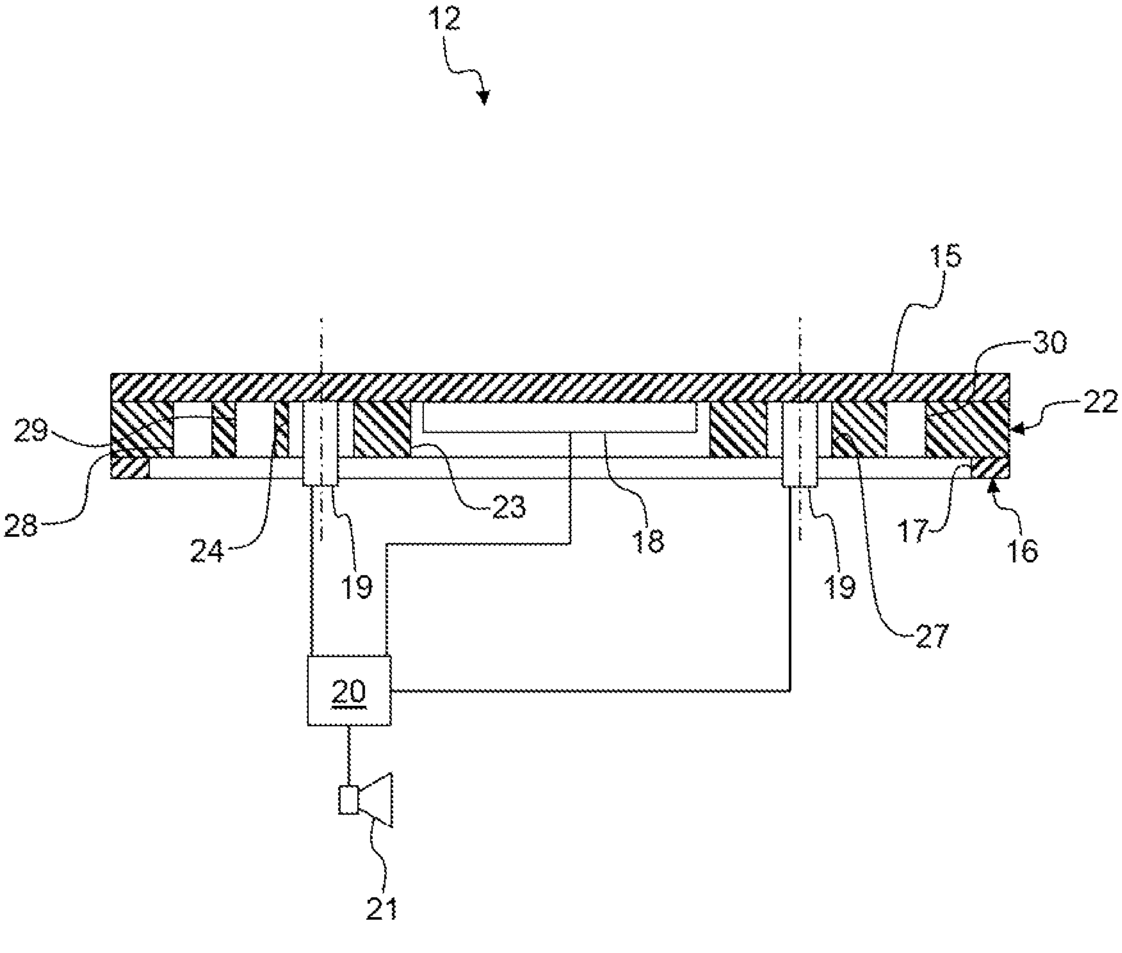
FIG. 5 shows a schematic sectional view of the operator control panel in accordance with the section line V-V in FIG. 4.

FIG. 4 shows a schematic front view of a further embodiment of an operator control panel 12. In FIG. 4, covered structural parts are also shown by dashed lines. FIG. 5 shows a schematic sectional view of the operator control panel 12 in accordance with the section line V-V in FIG. 4. Reference is made below simultaneously to FIGS. 4 and 5.

In addition to the operator control front 15 already mentioned previously and the panel carrier 16, the operator control panel 12 comprises an intermediate element 22. The panel carrier 16 comprises a recess 17 as already mentioned previously. The intermediate element 22 is arranged between the operator control front 15 and the panel carrier 16. Preferably, the intermediate element 22 is adhesively bonded to the operator control front 15 and to the panel carrier 16. The intermediate element 22 is preferably made of a plastic material. In particular, the intermediate element 22 may be made of polymethyl methacrylate (PMMA). The intermediate element 22 comprises a recess 23, in which an input and output facility 18 as already mentioned is accommodated. The input and output facility 18 may be adhesively bonded to the operator control front 15.

Furthermore, the intermediate element 22 comprises cutouts or recesses 24 to 27, in which haptic actuators 19 as already mentioned are accommodated. This means that a plurality of haptic actuators 19 are provided. For example, four haptic actuators 19 of this kind may be provided, which are guided through the panel carrier 16 and the intermediate element 22. The haptic actuators 19 are coupled to a control unit 20 as previously mentioned. Furthermore, an optional acoustic signal emitter 21 is also actively connected to the control unit 20. The intermediate element 22 furthermore comprises cutouts or recesses 28 to 30, with the aid of which it is possible to influence a propagation of waves of a structure-borne sound generated with the aid of the haptic actuators 19. The number and the shape of the recesses 28 to 30 are freely selectable. The recesses 28 to 30 perforate the intermediate element 22 completely or only partially.

In order to achieve a noticeable haptic sensation or in order to achieve an optimal transfer of sound for acoustic signals when the operator control panel 12 is actuated, it is necessary that the operator control panel 12 can be made to vibrate and therefore can vibrate as freely as possible. The more rigid connections are provided between the operator control front 15 and the panel carrier 16, the less the system is able to vibrate. For this reason, a certain area on the operator control front 15 is to be kept free of rigid connections. This takes place with the aid of the recesses 28 to 30, for example. The size and shape of these free areas is determined by the size of the region in which a haptic operator control feedback is intended to take place. The minimum size of this free area is stipulated by the size of the input and output facility 18, which is arranged on the rear side of the operator control front 15. If it is not possible to dispense with a certain amount of mechanical stabilization of the panel carrier 16 here, then the connection is to be designed such that the haptic sensation or the structure-borne sound waves are nevertheless able to propagate.

The transfer of the haptic sensation to the operator control front 15 is vastly dependent upon the mechanical and geometric design of the operator control panel 12. According to the desired strength of the haptic feedback, this design in this context determines an adaptation or a reduction of the power of the haptic actuator 19 and/or of the signal duration of the haptic signal. The position of the haptic actuator 19 on the operator control front 15 depends upon whether only individual regions of the same or the entire operator control front 15 are intended to be equipped with the haptic feedback.

When equipping individual actuation regions or touch buttons for haptic feedback, the haptic actuator 19 can be attached to the rear side of the operator control front 15, directly at the position of the touch button or immediately to the left or to the right adjacent to the touch button. In this context, the haptic sensation is only intended to be perceived locally at the point of the touch button. In this context, surrounding regions of the touch button are only weakly excited by the haptic signal and are not perceived as haptic feedback. This can be accomplished by attaching a material which absorbs structure-borne sound to the operator control panel 12 and keeping the positions of selective haptic sensation free from said material. This may be the plastic material of the intermediate element 22, for example. Alternatively, it is possible for a corresponding haptic actuator 19 with lower power to be used.

In order to make the haptic sensation on the operator control front 15 more strongly noticeable locally, the operator control panel 12 can be designed thinner mechanically at these points, in particular by way of depressions on the rear side of the operator control front 15. In this context, the depression on the operator control front 15 can be at the place where the haptic actuator 19 is arranged. In this case, the haptic actuator 19 is located in an indentation. By way of this indentation, the operator control front 15 is thinner at this point, wherein it becomes possible for the haptic actuator 19 to excite the operator control front 15 more easily. Alternatively, the region in which the haptic sensation is to be perceived can be depressed. By way of the thinner operator control front 15, the haptic sensation can be more effectively noticeable, without modifying the strength of the haptic sensation. In this context, the position of the haptic actuator 19 and the depression can be chosen independently of one another. If larger regions are intended to be equipped with haptic feedback, then, as explained with reference to FIGS. 4 and 5, a plurality of haptic actuators 19 are provided, which are to be arranged to the left and/or to the right adjacent to the input and output facility 18.

In order now to be able to dispense with countersunk areas on the operator control front 15 itself, which can only be manufactured with great difficulty and expense, the previously explained three-part design with the intermediate element 22, the operator control front 15 and the panel carrier 16 is provided. The intermediate element 22 can be optimized in relation to the sensitivity of the touch buttons and the desired strength of the haptic feedback. In this context, the intermediate element 22 preferably has a wall thickness of approx. 3 mm. In this context, the recesses 23 to 27 for the input and output facility 18 and the haptic actuators 19 are provided. In order to optimize the vibrations of the operator control panel 12, the recesses 28 to 30 are provided. The operator control front 15, which is preferably designed as a glass plate, preferably has a wall thickness of approx. 1.5 mm, as already mentioned previously. Due to the thin material of the operator control front 15, a simpler and better-functioning touch and haptic implementation is produced.

Asymmetry in the design of the operator control panel 12, i.e. different haptic strengths on the operator control front 15, can be compensated for by modifying the haptic duration and the power of the haptic actuator 19. In particular, however, these can also be compensated for by modifying the haptic actuators 19 themselves, if no modifications to the power of the haptic actuator 19 or the haptic duration are to be made. This may be necessary due to interfering acoustic effects, for example. The position of the haptic actuator 19 or the haptic actuators 19 on the operator control front 15 is to be chosen such that the reflected vibrations, which arise at the edges of the operator control panel 12, are superimposed with the exciter vibration of the haptic actuator 19 at the input and output facility 18 to the maximum extent.

Each previously mentioned embodiment of the operator control panel 12 experiences a maximum excitation of vibration due to the haptic actuator 19 in a certain frequency range. This is determined by the resonance frequency of the operator control panel 12 and is dependent upon the two storage elements of mass and inner spring of the materials used. In this context, the inner attenuation of the materials of the overall system of the operator control panel 12 determines the quality of the vibration system and thus the amplitude of the mechanical vibration and the width of the frequency range. In the region of the resonance frequency, it is possible for the power to be greatly reduced depending upon the quality of the resonance. The stronger the resonance vibration is embodied, the lower it is possible to choose the power of the haptic actuator 19, but the more narrowband the frequency range becomes. By choosing or varying the frequency of the haptic actuator 19 accordingly, it is therefore possible for the haptic function to be optimized in relation to manufacturing tolerances of all structural parts and the best possible generation of vibrations.

The uncoupling of the transfer of sound in relation to the surrounding appliance carcass 14 with regard to the cavity resonances and covibrating materials thereof is likewise to be achieved from a structural perspective. This can take place, for example, by the targeted attachment of heavy adsorbent materials, whereby interfering structure-borne sound resonances are attenuated. In addition to the structural design of the operator control panel 12 for optimizing the operator control haptics, it may therefore additionally be necessary to uncouple the connection between the appliance carcass 14 and the operator control panel 12 from an acoustic perspective.

The operator control panel 12 is made to vibrate due to the vibrations of the haptic actuator 19. These vibrations are also transferred to the surrounding materials and may be perceived as interfering noise. In order to prevent this, the number of connections, for example screwed connections, between the appliance carcass 14 and the operator control panel 12 can be reduced. Alternatively, the existing connections can be uncoupled in terms of structure-borne sound by way of resilient suspensions. Connection materials with a great amount of internal attenuation can also reduce the interfering structure-borne sound in this case.

The previously explained operator control panel 12 comprises a large number of advantages. For one, it is made possible to equip a rigid operator control panel 12 with haptic sensation. The power of the haptic actuator 19 can be reduced by the previously described three-layer structural design of the operator control panel 12. The haptic touch sensation can be improved by the described structural influencing of the operator control panel 12. This results in the opportunity of selective haptic sensation on a rigid operator control panel 12 with the aid of a plurality of haptic actuators 19 with reduced power.

Although the present invention has been described with reference to exemplary embodiments, it can be modified in numerous different ways.

The invention claimed is:

1. An operator control panel for a household appliance, said operator control panel comprising:

an operator control front, the operator control front defining at least one free area that is free of rigid connections;

a panel carrier supporting the operator control front and having a recess, the recess being disposed behind the at least one free area; and a haptic actuator guided through the recess of the panel carrier for coupling to the operator control front so that during an operator control procedure of the operator control panel the haptic actuator outputs via the operator control front a haptic signal as feedback to a user in response to the operator control procedure.

2. The operator control panel of claim 1, for use in a household cooking appliance.

3. The operator control panel of claim 1, wherein the haptic actuator is configured to output an acoustic signal as feedback in response to the operator control procedure.

4. The operator control panel of claim 1, further comprising an acoustic signal emitter outputting an acoustic signal as feedback in response to the operator control procedure.

5. The operator control panel of claim 1, further comprising an input and output facility detecting the operator control procedure and outputting an operating state of the household appliance.

6. The operator control panel of claim 5, wherein the input and output facility is accommodated in the recess.

7. The operator control panel of claim 5, wherein the haptic actuator is arranged adjacent to the input and output facility.

8. The operator control panel of claim 5, further comprising a plurality of said haptic actuator arranged distributed around the input and output facility.

9. The operator control panel of claim 1, further comprising an intermediate element arranged between the operator control front and the panel carrier.

10. The operator control panel of claim 9, wherein the haptic actuator is guided through the intermediate element.

11. The operator control panel of claim 9, wherein the intermediate element is adhesively bonded to the operator control front and the panel carrier.

12. The operator control panel of claim 9, wherein the intermediate element is made of a plastic material and the operator control front is made of glass.

13. The operator control panel of claim 9, wherein the intermediate element is made from polymethyl methacrylate.

14. The operator control panel of claim 9, wherein the intermediate element comprises a recess capable of influencing a propagation of waves of a structure-borne sound generated by the haptic actuator.

15. The operator control panel of claim 14, wherein the recess of the intermediate element forms a local depression on the operator control panel to achieve a local influencing of the haptic signal.

16. A household appliance, comprising an operator control panel, said operator control panel comprising an operator control front defining at least one free area that is free of rigid connections, a panel carrier supporting the operator control front and having a recess disposed behind the at least one free area, and a haptic actuator guided through the recess of the panel carrier for coupling to the operator control front so that during an operator control procedure of the operator control panel the haptic actuator outputs via the operator control front a haptic signal as feedback to a user in response to the operator control procedure.

17. The household appliance of claim 16, constructed in the form of a household cooking appliance.

18. The household cooking appliance of claim 16, further comprising an appliance carcass including an insulating material to absorb structure-borne sound resonances of the haptic actuator.

* * * * *